(12) United States Patent
Choi

(10) Patent No.: US 10,969,275 B2
(45) Date of Patent: Apr. 6, 2021

(54) ON-CHIP SPECTROMETER EMPLOYING PIXEL-COUNT-MODULATED SPECTRAL CHANNELS AND METHOD OF MANUFACTURING THE SAME

(71) Applicant: NANOLAMBDA KOREA, Daejeong (KR)

(72) Inventor: Byung Il Choi, Pittsburgh, PA (US)

(73) Assignee: NanoLamda Korea, Daejeong (KR)

( * ) Notice: Subject to any disclaimer, the term of this patent is extended or adjusted under 35 U.S.C. 154(b) by 126 days.

(21) Appl. No.: 16/051,834

(22) Filed: Aug. 1, 2018

(65) Prior Publication Data

US 2019/0041263 A1  Feb. 7, 2019

Related U.S. Application Data

(60) Provisional application No. 62/540,233, filed on Aug. 2, 2017.

(51) Int. Cl.
| | |
|---|---|
| *G01J 3/12* | (2006.01) |
| *G01J 3/02* | (2006.01) |
| *G01J 3/28* | (2006.01) |
| *G01J 3/36* | (2006.01) |

(52) U.S. Cl.
CPC ............... *G01J 3/0254* (2013.01); *G01J 3/12* (2013.01); *G01J 3/2803* (2013.01); *G01J 3/2823* (2013.01); *G01J 3/36* (2013.01); *G01J 2003/1213* (2013.01); *G01J 2003/1217* (2013.01); *G01J 2003/1239* (2013.01); *G01J 2003/2806* (2013.01); *G01J 2003/2813* (2013.01)

(58) Field of Classification Search
CPC .......... G01J 3/2803; G01J 3/2823; G01J 3/36; G01J 2003/1213; G01J 2003/1239
See application file for complete search history.

(56) References Cited

U.S. PATENT DOCUMENTS

| | | | |
|---|---|---|---|
| 8,284,401 B2 | 10/2012 | Choi et al. | |
| 8,542,359 B2 | 9/2013 | Choi et al. | |
| 9,395,244 B2 | 7/2016 | Kurokawa et al. | |
| 2006/0054782 A1* | 3/2006 | Olsen | H04N 5/2353 |
| | | | 250/208.1 |

(Continued)

*Primary Examiner* — Maurice C Smith
(74) *Attorney, Agent, or Firm* — The Marbury Law Group PLLC

(57) ABSTRACT

An array of sensor pixels is formed on a substrate, and a signal processing unit is connected to the array of sensor pixels. The signal processing unit includes multiple spectral channels that are defined by a respective transmission curve of each optical filter of at least one associated sensor pixel. Each of the sensor pixels includes a stack of a respective photodetector and a respective optical filter. Each spectral channel receives an output signal from one or more sensor pixels including an optical filter having the same transmission curve. At least one spectral channel has a greater number of sensor pixels than another spectral channel among the multiple spectral channels. The different number of pixels for the spectral channels can be employed to compensate for variations of sensor efficiency as a function of wavelength. Adjustment to sensor gain can be minimized through use of different number of pixels for different spectral channels.

18 Claims, 13 Drawing Sheets

(56) References Cited

U.S. PATENT DOCUMENTS

| | | | |
|---|---|---|---|
| 2006/0209413 A1* | 9/2006 | Kim .................. | G02B 5/284 |
| | | | 359/577 |
| 2010/0182598 A1 | 7/2010 | Choi et al. | |
| 2013/0044321 A1 | 2/2013 | Choi et al. | |
| 2013/0181112 A1* | 7/2013 | Richardson ............ | H04N 5/361 |
| | | | 250/208.1 |
| 2014/0022544 A1 | 1/2014 | Kurokawa et al. | |

* cited by examiner

ON-CHIP SPECTROMETER EMPLOYING PIXEL-COUNT-MODULATED SPECTRAL CHANNELS AND METHOD OF MANUFACTURING THE SAME

RELATED APPLICATIONS

This application claims benefit of priority of U.S. Provisional Application No. 62/540,233, filed on Aug. 2, 2017, the entire contents of all of which are incorporated herein by reference.

FIELD

The present disclosure is directed to solid state spectrometers employing pixel-count-modulated spectral channels to provide uniform detection sensitivity across a spectral range and methods of manufacturing the same.

BACKGROUND

A spectrometer, or a spectrum sensor, is an instrument configured to analyze the spectral distribution of impinging light. The spectrometer differs from imagers or cameras in that the spectrometer does not generate a spatial map of incoming light or a two-dimensional image at one or more (typically three) wavelength bands, but generates a spectral image of the entire impinging light without regard to spatial distribution of the intensity of light. The spectral image includes a set of intensity measurements for each wavelength range, which is herein referred to as a spectral channel or a "spectral channel." Typically, a spectral image covers the entire visible spectrum, which is the wavelength range from 400 nm to 800 nm. Some spectrometers can cover a subset of the infrared wavelength range, which includes the wavelength range from 800 nm to 1 mm. Some spectrometers can also cover a subset of the ultraviolet wavelength range, which includes wavelength range from 10 nm to 400 nm. Typically, more than 10 spectral channels, such as 100 or more spectral channels, are employed in a spectrometer.

An "on-chip spectrometer," an "on-chip spectrum sensor," a "spectrometer-on-chip," or a "spectrum sensor on chip" refers to a spectrometer employing a single chip on which semiconductor devices for measuring the intensity of light at a respective spectral channel are mounted in parallel. The on-chip spectrometers differ from conventional spectrometers most prominently by the size. Typically, an on-chip spectrometer has a dimension less than 10 cm×10 cm×10 cm, such as less than 7 cm×5 cm×5 cm, and may weigh less than 200 g. This is a tremendous improvement in portability compared to conventional spectrometers, which typically have a dimension greater than 70 cm×50 cm×50 cm, and weigh at least 30 kg. The portability of the on-chip spectrometer is achieved by employing solid-state devices for each component of the spectrometer. Thus, a dispersive prism and a collimator in a conventional spectrometer is replaced by an array of band pass filters that allow passage of light only within the respective wavelength range, and an array of solid state detectors underlying the array of band pass filters. An example of such an on-chip spectrometer is described in U.S. Pat. No. 8,284,401 B2 to Choi et al. and U.S. Pat. No. 8,542,359 B2 to Choi et al, which are assigned to NanoLambda, Inc. as of 2017.

Optical spectroscopy allows complete characterization of the spectral distribution of light emanating from an object or an ambient. The information contained in the spectral distribution of light can be captured by a spectrometer, and can be used to detect and quantify the characteristics or concentration of a physical, chemical, or biological object. Spectroscopy is a non-destructive measurement. For example, optical diagnostics using spectroscopy allows acquisition of chemical and/or biological information without taking a physical specimen.

A performance metric for spectrometers is accurate characterization of intensity distribution of impinging light across the multiple spectral channels. In order to provide accurate measurement of intensity for the impinging light, the spectral channels of the spectrometer need to provide the same sensitivity across the entire measurement wavelength range of the spectrometer. In other words, the spectrometer needs to generate the same measured spectral intensity for the same number of photons irrespective of the energy of the photons. This is a very challenging task because sold state photodetectors display a non-uniform detection efficiency curve across the visible spectrum. This challenge becomes even more significant for on-chip spectrometers, which cannot alter the scan speed across the wavelength range in order to compensate for the non-uniform detection efficiency as a function of wavelength. In addition, the spectral responses of different filters for on-chip spectrometers are also non-uniform which multiply the non-uniformity of spectral response. In order to provide a high performance on-chip spectrometer, therefore, a method of compensating for the non-uniform detection efficiency of semiconductor detectors is desired.

SUMMARY

According to an aspect of the present disclosure, a spectrum sensor is provided, which comprises: an array of sensor pixels located on a substrate; and a signal processing unit including L spectral channels, L being an integer greater than 7. Each of the sensor pixels comprises a stack of a respective photodetector and a respective optical filter configured to pass light within a respective transmission curve. For each integer k from 1 to L, a k-th spectral channel receives an output signal from each sensor pixel including an optical filter proving a k-th transmission curve. At least one spectral channel among the L spectral channels has a greater number of sensor pixels than another spectral channel among the L spectral channels.

According to another aspect of the present disclosure, a method of fabricating a spectrum sensor is provided, which comprises: forming an array of sensor pixels on a substrate; and electrically connecting a signal processing unit to the array of sensor pixels. The signal processing unit includes L spectral channels, L being an integer greater than 7. Each of the sensor pixels comprises a stack of a respective photodetector and a respective optical filter configured to pass light within a respective transmission curve. For each integer k from 1 to L, a k-th spectral channel receives an output signal from each sensor pixel including an optical filter proving a k-th transmission curve. At least one spectral channel among the L spectral channels has a greater number of sensor pixels than another spectral channel among the L spectral channels.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described with reference to the accompanying drawings. Elements are not drawn to scale. Wherever possible, the same reference numbers will be used throughout the drawings to refer to the same or like parts. References made to particular examples and implementations are for illustrative purposes, and are not intended to limit the scope of the invention or the claims.

Figure 1:
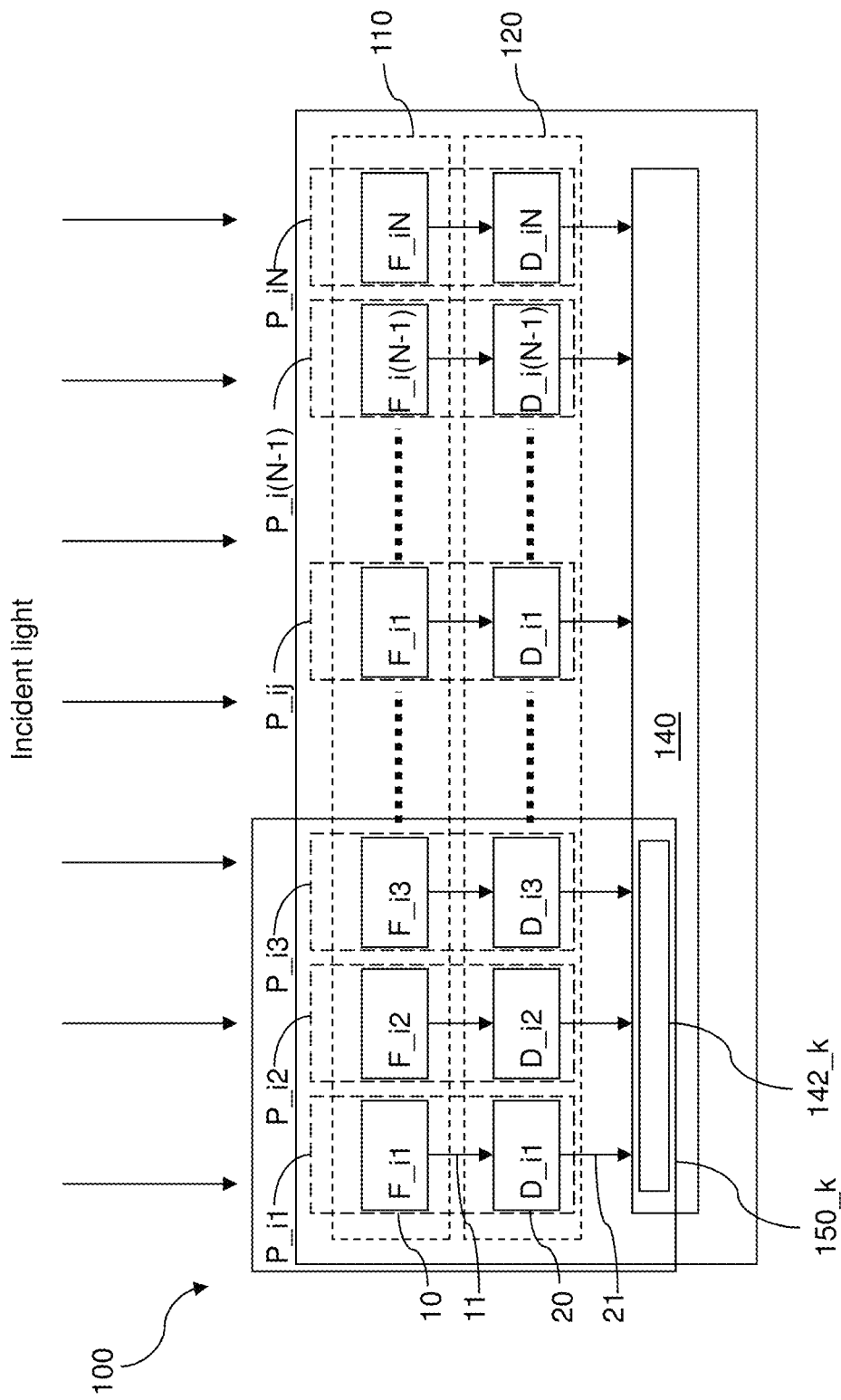
FIG. 1 is a schematic view of a sensor array and a signal processing unit of an exemplary spectrum sensor that illustrates grouping of sensor pixels into a spectral channel according to an embodiment of the present disclosure.
Figure 2:
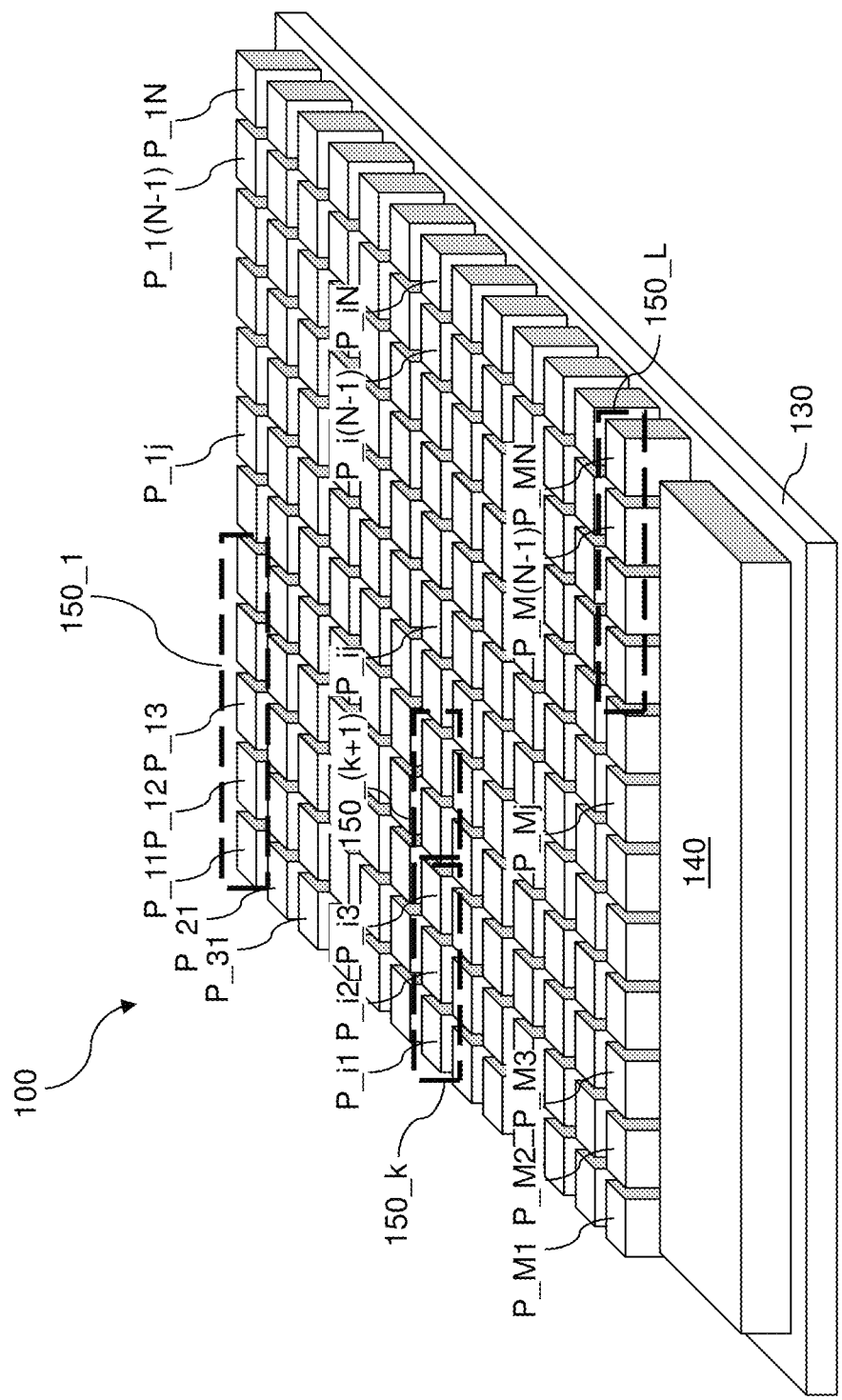
FIG. 2 is a perspective view of the sensor array and the signal processing unit of the exemplary spectrum sensor of FIG. 1.

Referring to FIGS. 1 and 2, a sensing unit 100 of an exemplary spectrum sensor is illustrated, which includes a sensor array and a signal processing unit 140. FIG. 1 is a schematic view and FIG. 2 is a perspective view of the sensing unit 100 of the exemplary spectrum sensor, which is an on-chip spectrum sensor. In one embodiment, the sensing unit 100 can be formed as a single semiconductor chip, which may be a silicon-based semiconductor chip or a III-V compound based semiconductor chip.

The sensing unit 100 can include a sensor array, which is an array of sensor pixels P_ij. In one embodiment, the array of sensor pixels P_ij can be in a configuration of a periodic two-dimensional array of sensor pixels P_ij. In one embodiment, the array of sensor pixels P_ij can be embodied as a rectangular M×N array of sensor pixels P_ij, in which the row index i runs from 1 to M, and the column index j runs from 1 to N. M and N are positive integers greater than 1. In one embodiment, M can be an integer in a range from 4 to 4,096, and N can be an integer in a range from 4 to 4,096, although lesser and greater positive numbers can be employed for each of M and N. For any pair of a fixed integer i and a fixed integer j, the sensor pixel P_ij refers to the sensor pixel located within the i-th row and within the j-th column. The set of all sensor pixels P_ij in which the integer i is a variable and the integer j is another variable forms the array of sensor pixels P_ij, which can have a total of M×N sensor pixels.

As used herein, a "sensor pixel" refers to a smallest device unit that can detect incident light and provide an output corresponding the intensity of the incident light. The array of sensor pixels P_ij can be located on a substrate 130. The substrate 300 can include metal interconnect structures such as metal lines and metal via structures therein. The metal interconnect structures within the substrate 300 can provide electrical connections between each sensor pixel P_ij and the circuitry within the signal processing unit 140. The signal processing unit 140 includes multiple spectral channels. As used herein, a "spectral channel" of a spectrometer refers to an electronic circuitry that provides a distinct electronic response (in the form of electrical current) as a function of input wavelengths. Thus, each spectral channel provides a distinct "spectral response curve," which is a wavelength-current curve that represents the magnitude of electrical current for input radiation of unit intensity at different wavelengths.

In one embodiment, each sensor pixel P_ij can include a stack of a respective photodetector 20 and a respective optical filter 10. Each optical filter 10 has a respective a transmission curve. As used herein, a "transmission curve" refers to the mathematical function that describes the transmission fraction of a monochromatic incident light as a function of wavelength. In one embodiment, each optical filter 10 belonging to different spectral channels can have different transmission curves, which can be effected by employing different designs for the optical filters 10 belonging to different spectral channels. Further, in case a spectral channel includes a plurality of sensor pixels therein, each optical filter 10 within the same spectral channel can have the same design, and therefore, the same transmission curve or substantially the same transmission curves (in which the difference among the transmission curves are insignificant and caused by variations in manufacturing processes).

Figure 3A:
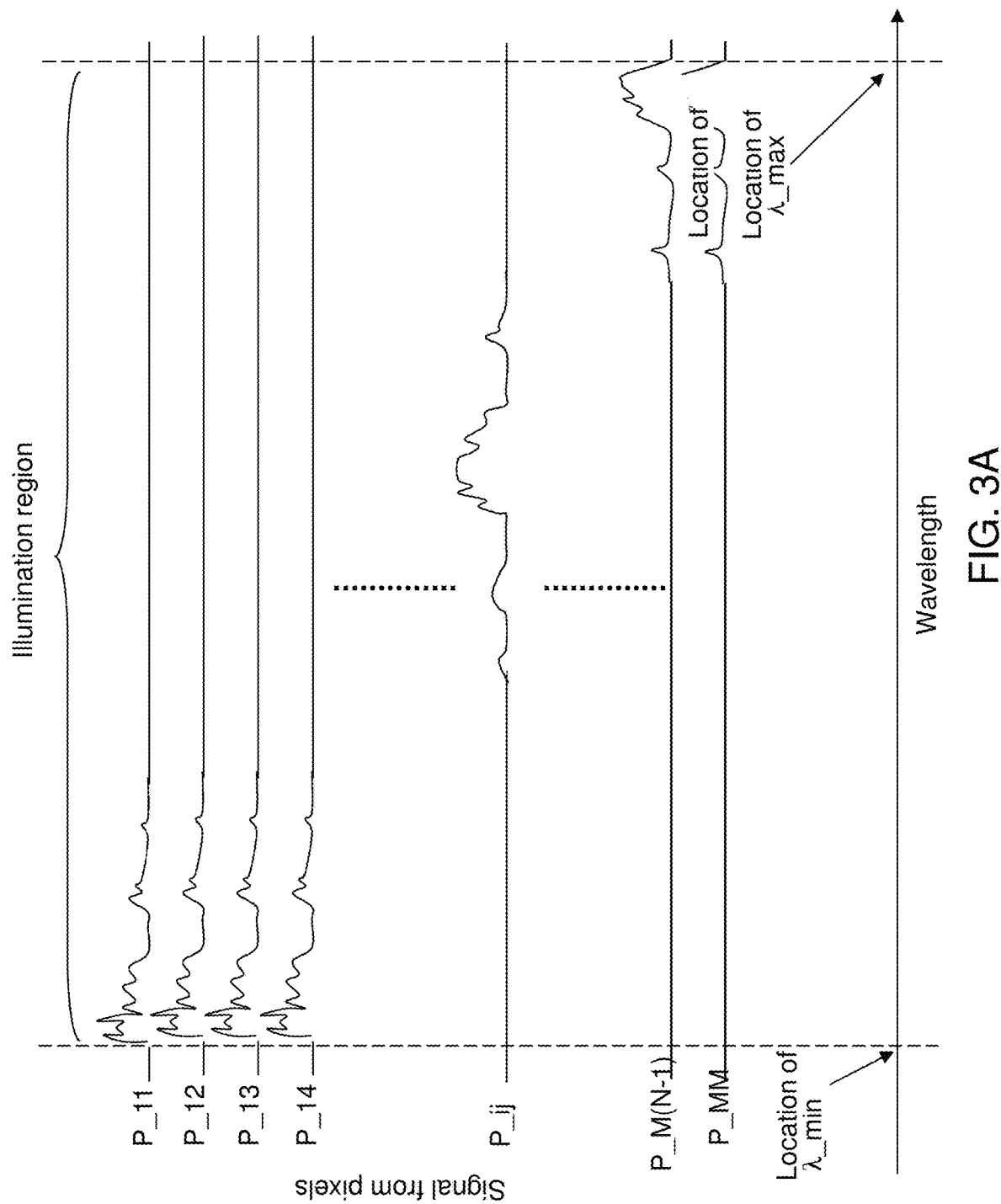
FIG. 3A is a set of transmission curves for the optical filters in the sensor array according to an embodiment of the present disclosure.

In one embodiment, each optical filter 10 can be a plasmonic filter including a respective metal sheet and openings therethrough. Plasmonic filters are described in U.S. Pat. No. 8,284,401 B2 to Choi et al. and U.S. Pat. No. 8,542,359 B2 to Choi et al, the entire contents of which are incorporated by reference herein. FIG. 3A illustrates transmission curves for the optical filters 10 that employ plasmonic filters, which can generally have multiple peaks and multiple valleys.

Figure 3B:
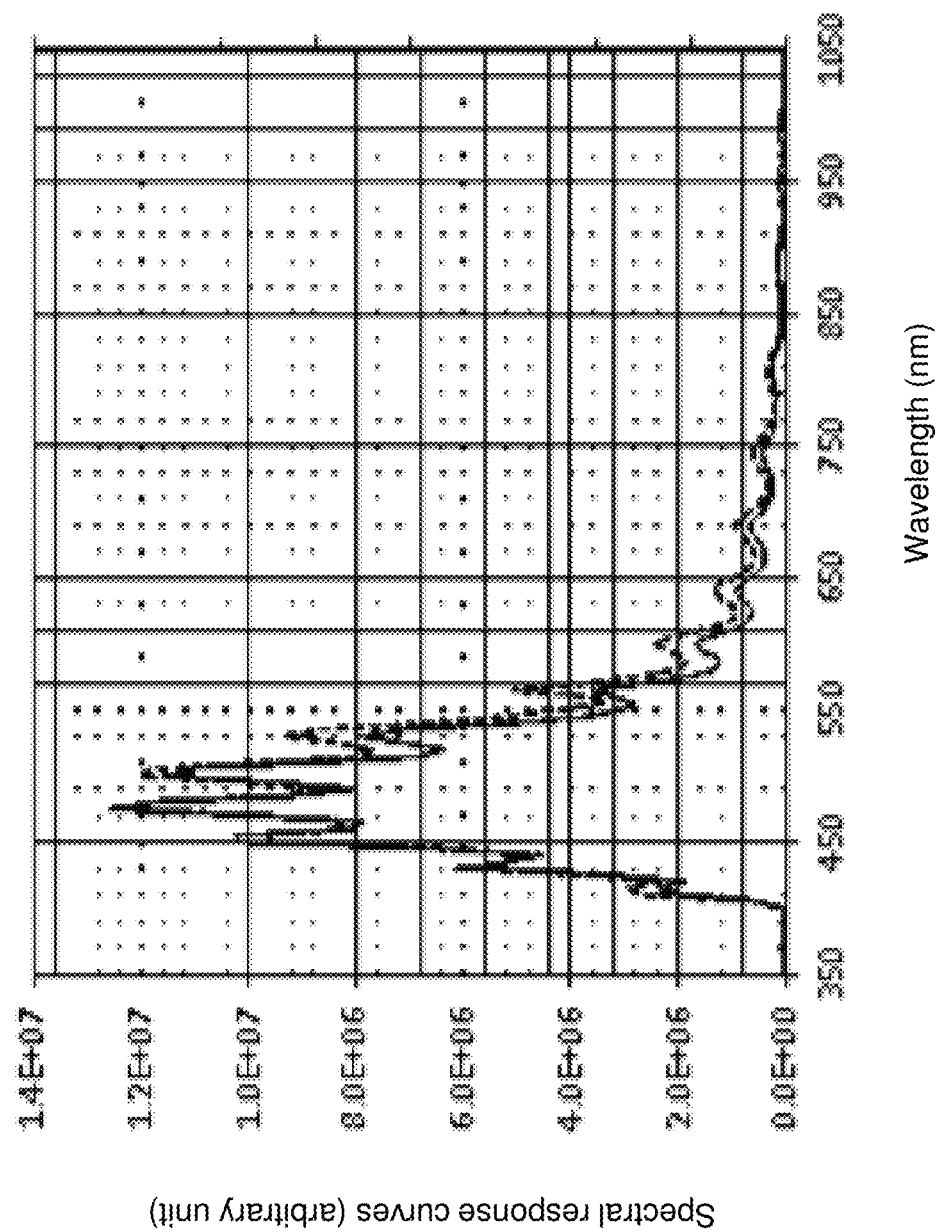
FIG. 3B illustrates a spectral response curve of a first exemplary pixel, which is determined by the combination of the sensitivity of photodetector and the optical filter thereupon.
Figure 3C:
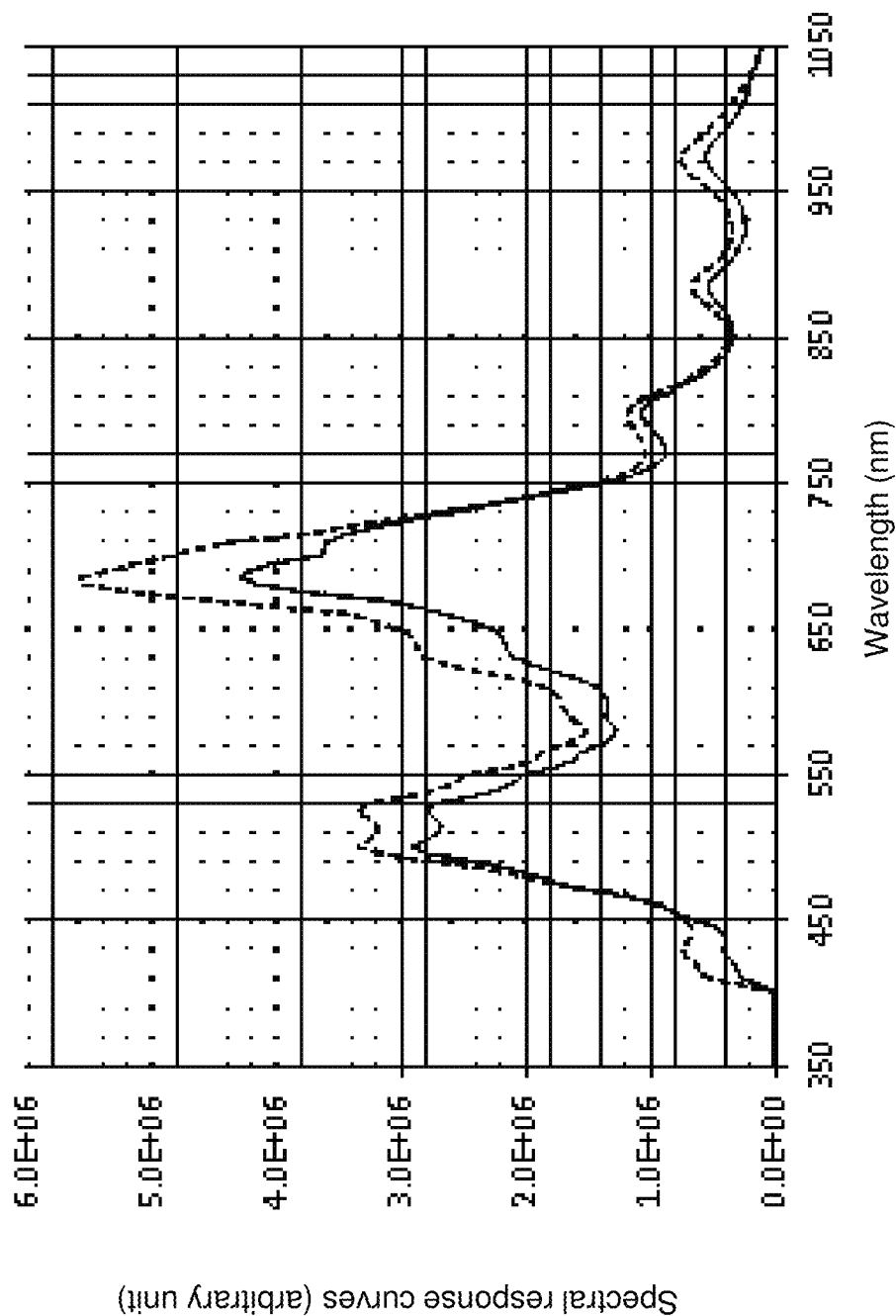
FIG. 3C illustrates a spectral response curve of a second exemplary pixel, which is determined by the combination of the sensitivity of photodetector and the optical filter thereupon.
Figure 3D:
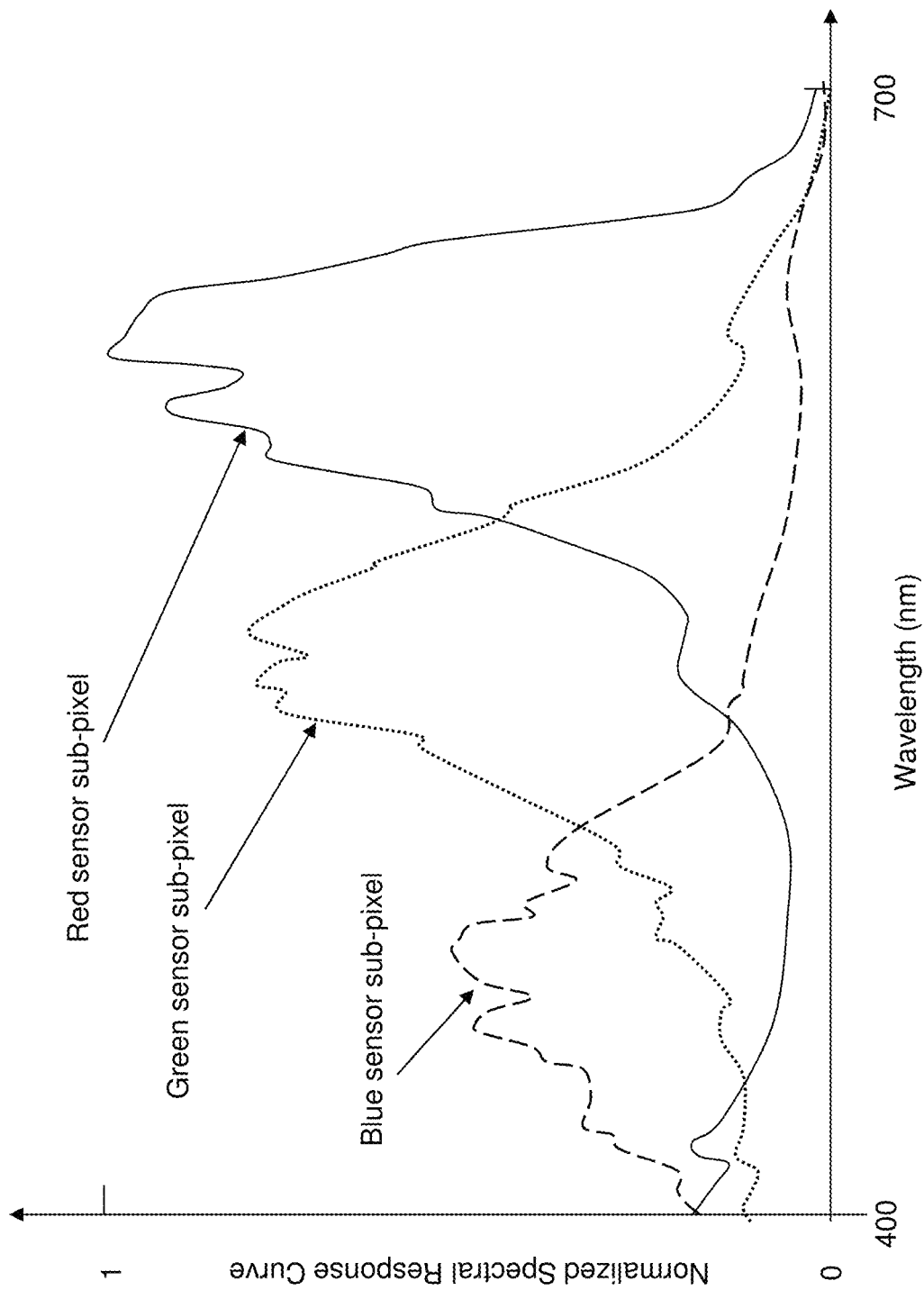
FIG. 3D illustrates non-uniform sensitivity levels among different filter pixels of a typical RGB image sensor.
Figure 3E:
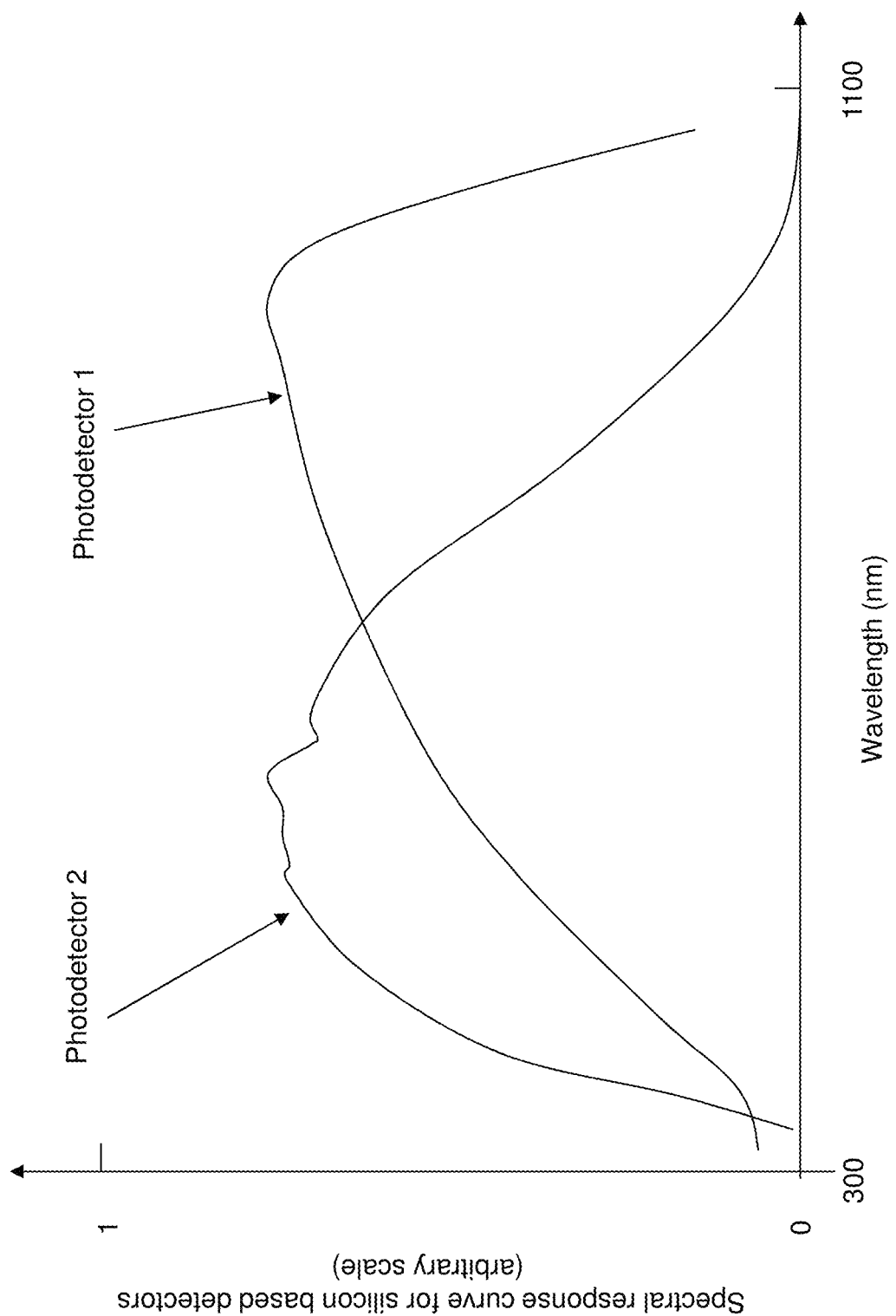
FIG. 3E shows different spectral sensitivities of two different silicon photodetectors.
Figure 3F:
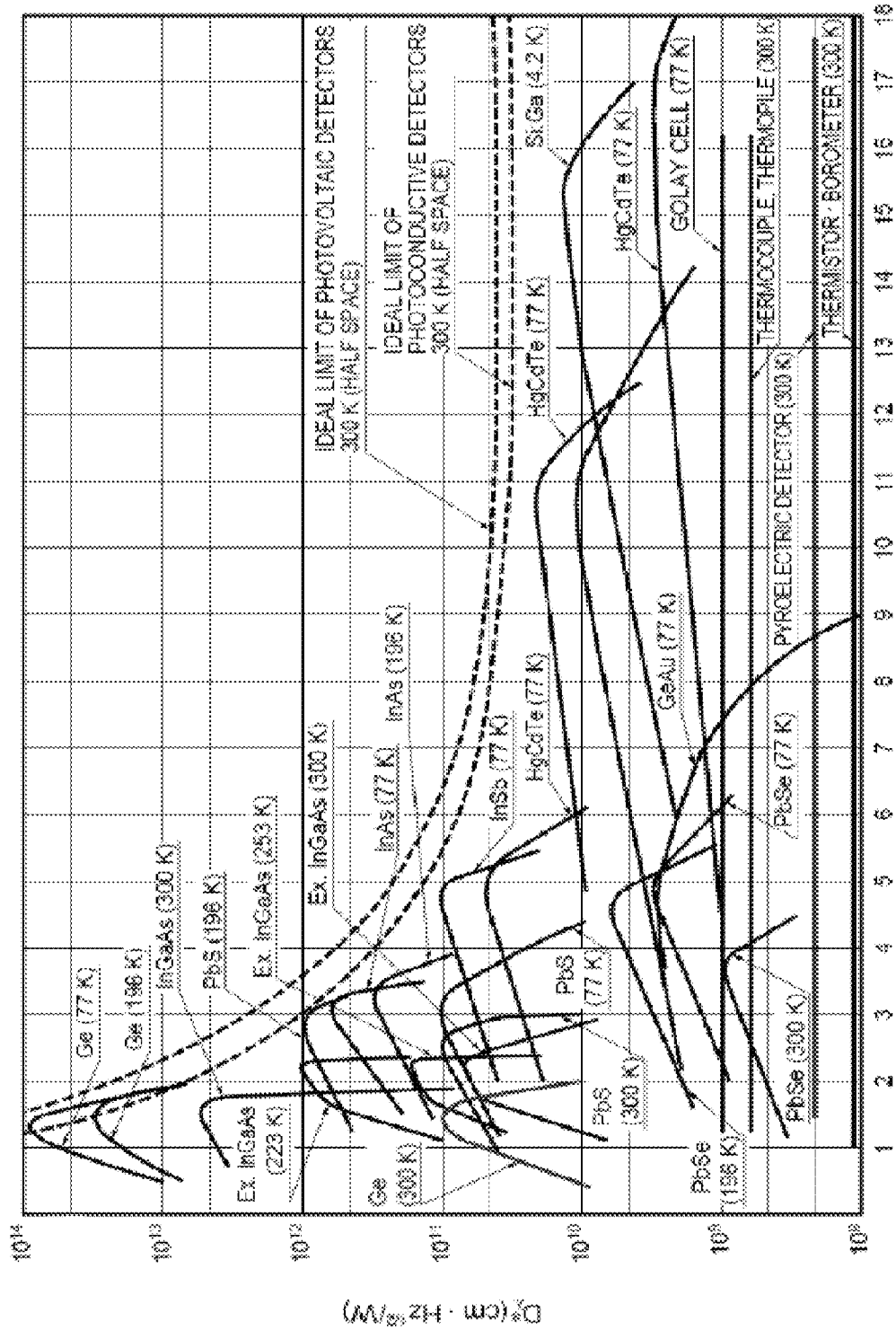
FIG. 3F shows different spectral sensitivities across wavelength ranges of different infrared (IR) photodetectors.

FIGS. 3B and 3C illustrate a spectral response curve of two exemplary pixels, each of which is determined by the combination of the sensitivity of photodetector and the optical filter thereupon. Two pixels can have significantly different power levels as illustrated by FIGS. 3A and 3B. FIG. 3D illustrates non-uniform sensitivity levels among different filter pixels of a typical RGB image sensor. FIG. 3E shows different spectral sensitivities of two different silicon photodetectors. FIG. 3F shows different spectral sensitivities across wavelength ranges of different infrared (IR) photodetectors.

Referring back to FIGS. 1 and 2, each optical filter 10 of the entire set of one or more sensor pixels for a spectral channel can have the same transmission curve by employing the same design for all of the plasmonic filter(s) within the spectral channel. The area of the optical filters 10 can be substantially the same across the optical filters 10, and can be substantially the same as the underlying photodetector 20. In one embodiment, the variations in the area of the optical filters can be less than 10% of the average area of the sensor pixels 10 within the array of sensor pixels. In this case, each sensor pixel 10 within the array of sensor pixels has a respective area within 90% and 110% of the average area of sensor pixels within the array of sensor pixels.

Each photodetector 20 can be a semiconductor photodetector based on silicon p-n junction or a p-n junction of a compound semiconductor material (such as gallium arsenide). A photodetector 20 located within the sensor pixel P_ij is herein referred to as a photodetector D_ij, i.e., a photodetector 20 located in the i-th row and in the j-th column. The photodetectors 20 can have the same design throughout the array of sensor pixels P_ij. In this case, the photodetectors 20 can constitute a two-dimensional M×N array of instances of a same photodetector design. In this case, each photodetector 20 can have the same area. The transfer characteristic, or the "sensitivity curve" of the photodetectors 20 can be the same across all the photodetectors 20 within the array of sensor pixels. The transfer characteristic of a photodetector 20 refers to the ratio of the electrical current output for a monochromatic irradiation of a unit intensity as a function of wavelength.

Figure 5:
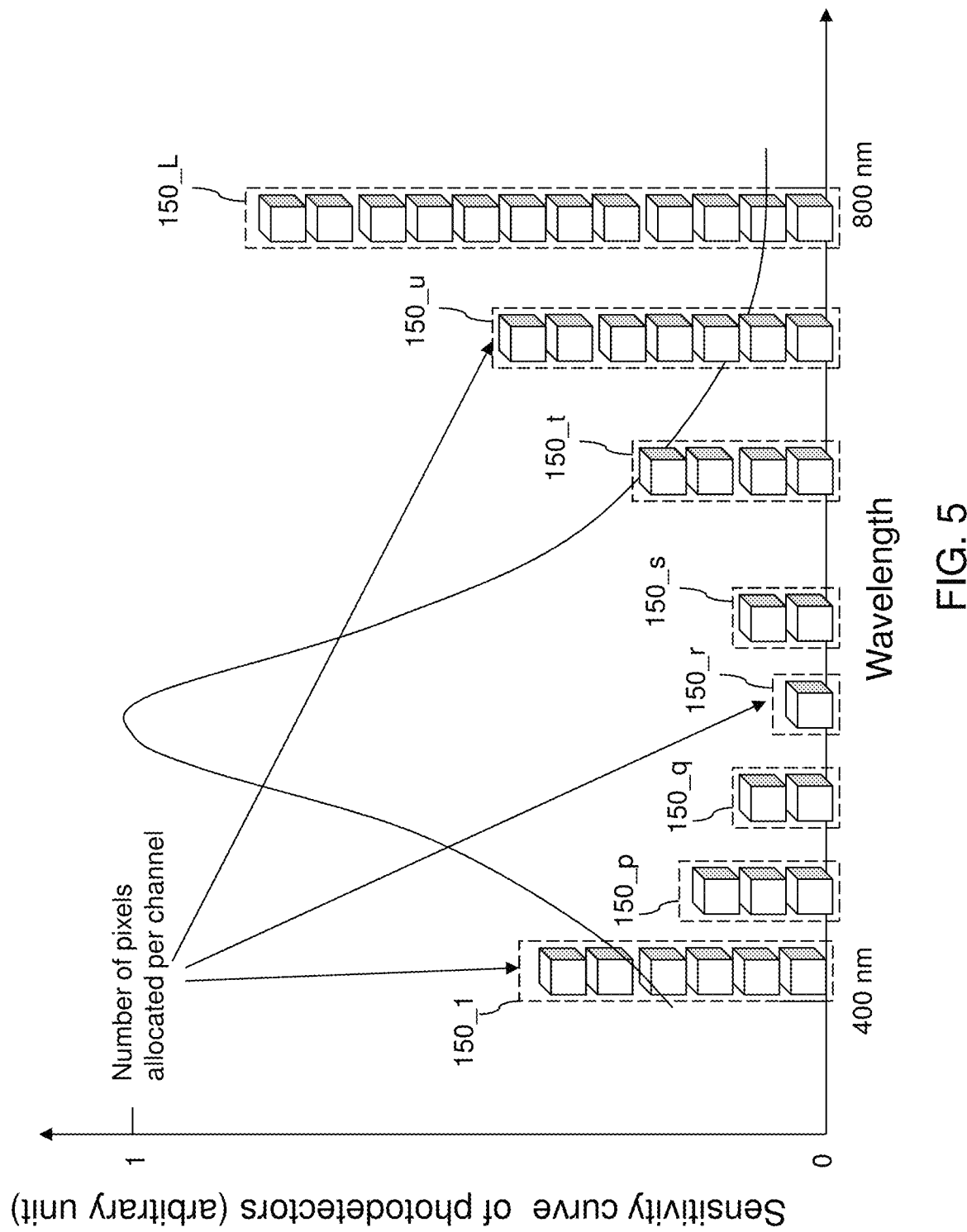
FIG. 5 is a schematic diagram illustrating the correlation between the sensitivity curve of a photodetector as a function of wavelength and the total number of sensor pixels per spectral channel.

The effectiveness of a monochromatic light that impinges on a photodetector 20 in generating photoelectrons is referred to as the sensitivity of the photodetector 20. In other words, the sensitivity of a photodetector 20 is the ratio of the generated photoelectric current to the intensity of a monochromatic light that impinges on the photodetector. The sensitivity of a photodetector 20 thus depends on the wavelength of the incident monochromatic light, and thus, is a function of the wavelength of the incident radiation. This function is referred to as a "sensitivity curve" of the photodetector 20. FIG. 5 illustrates an exemplary sensitivity curve of the photodetectors 20 within the array of sensor pixels.

Within each sensor pixel P_ij, the optical filter 10 modifies the spectral distribution of incident light by the respective transmission curve and passes the filtered light 11 (which is an attenuated light spectrum) to the underlying photodetector 20. Each optical filter 20 belonging to the same spectral channel can have the same optical transmission curve. The filtered light 11 that passes through the overlying optical filter 10 impinges on the underlying photodetector 20, which generates a respective detection signal 21 that is in the form of photoelectric current. The photoelectric current from each sensor pixel is proportional to the integral of the product of a first function representing the intensity distribution of incident light spectrum onto the optical filter 10, a second function representing the transmission curve of the optical filter 10, and a third function representing the sensitivity curve (the transfer characteristic) of the photodetector 20 over the entire wavelength range of the incident light that impinges on the optical filter 10.

The product of the second function representing the transmission curve of the optical filter 10 and the third function representing the sensitivity curve of the photodetector 20 defines the transfer characteristic of the corresponding sensor pixel, which is herein referred to as a spectral response curve. The integral of the product of the second function representing the transmission curve of the optical filter 10 and the third function representing the sensitivity curve of the photodetector 20 over the entire wavelength range of the sensing unit 100 defines the detection efficiency of the corresponding sensor pixel. The detection efficiency is a measure of effectiveness of a sensor pixel as averaged over the entire wavelength range of the sensing unit.

The spectral response curve of a sensor pixel represents the sensitivity of the sensor pixel as a function of the wavelength. The spectral response curve of each spectral channel represents the sensitivity of the spectral channel as a function of the wavelength, i.e., the magnitude of photoelectron-induced current per unit intensity of radiation at each wavelength, for example, from 400 nm to 800 nm or the entire measurement range of the sensor pixel. In case a spectral channel includes a plurality of sensor pixels, the spectral response curve of the spectral channel is the sum of all spectral response curves of the plurality of sensor pixels. In case the sensor pixels within the same spectral channel have the same, or substantially the same, spectral response curve, the spectral response curve of the spectral channel can be the same as, or substantially the same as, the product of the spectral response of a sensor pixel therein and the total number of sensor pixels within the spectral channel.

According to an aspect of the present disclosure, the total number L of spectral channels of the sensing unit 100 can be less than the total number of sensor pixels P_ij. In one embodiment, the ratio of the total number of sensor pixels P_ij to the total number of spectral channels of the sensing unit 100 can be in a range from 1.5 to 20, such as from 2.0 to 10. Thus, a plurality of sensor pixels P_ij can be connected to a same spectral channel for at least some of the spectral channels. Thus, the mapping between the sensor pixels P_ij to the spectral channels of the sensing unit 100 can be a non-injective mapping, i.e., a mapping that is not a one-to-one mapping. At least for some spectral channels, multiple sensor pixels P_ij correspond to the same spectral channel of the sensing unit 100.

In one embodiment, the M×N sensor pixels P_ij can be grouped into L spectral channels 150_k, in which the positive integer index k runs from 1 to L. The total number L of the spectral channels can be in a range from 8 to 1 million, from 32 to 16,384, from 64 to 4,096, and/or from 128 to 1,024. FIG. 1 schematically illustrates a case in which the k-th spectral channel 150_k includes three sensor pixels, i.e., the sensor pixel in the i-th row and first column P_i1, the sensor pixel in the i-th row and the second column P_i2, and the sensor pixel in the i-th row and the third column P_i3. Generally speaking, a spectral channel can include one or more sensor pixels.

The design for the optical filter 10 can be the same among all of the optical filters 10 within the same spectral channel in case the spectral channel includes multiple sensor pixels, and the spectral response curve can be the same, or substantially the same (within the limit imposed by variations during manufacturing), across the sensor pixels within the same spectral channel.

Each detection signal 21 for a same spectral channel is routed to a same signal amplifier. For each integer k from 1 and L, the k-th spectral channel can include a k-th signal amplifier 142_k, which receives each detection signal 21 from the entire set of photodetector(s) 20 for the k-th spectral channel. In case multiple detection signals 21 are provided for a spectral channel, all of the multiple detection signals 21 are added as inputs for the corresponding signal amplifier. The signal amplifiers can be located within the signal processing unit 140. In one embodiment, the detection signals 21 can be routed through the substrate 130. Alternatively, the signal processing unit 140 may be formed directly underneath the array of photodetectors 20.

In one embodiment, each photodetector 20 in the array of sensor pixels can include a same semiconductor material (such as silicon or a III-V compound semiconductor material) having the same photosensitive junction structure and has the same device area. In one embodiment, the multiple spectral channels can include L spectral channels, which can be at least 16 spectral channels having different transmission curves. In one embodiment, for each integer k from 1 to L, a k-th spectral channel receives an output signal from each sensor pixel including an optical filter having a k-th transmission curve.

Figure 4:
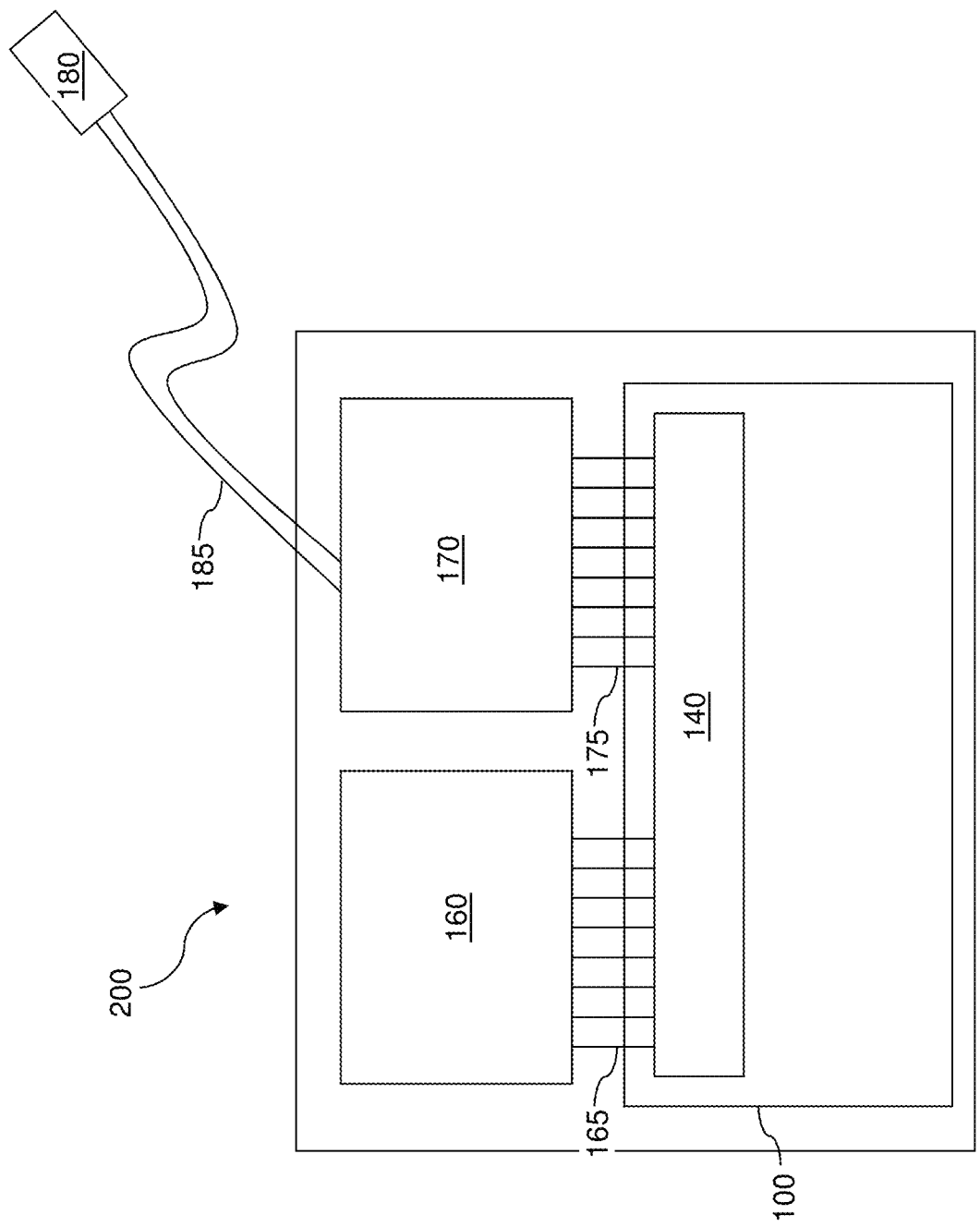
FIG. 4 is a schematic view of the exemplary spectrum sensor of FIGS. 1 and 2.

FIG. 4 illustrates a spectrum sensor 200, which includes a sensor unit 100 as described above, an optional memory 160 in communication with the sensor unit 100 via a first signal bus 165, and a program controller 170 in communication with the sensor unit 100 via a second signal bus 175. The program controller 170 can be configured to communicate with an external electronic device (such as a cellular phone or a personal computer that is optionally configured with a control and/or display program) through a connector 180 and a connection cable 185.

The memory 160, if present, can store data for the spectral response curves of each of the sensor pixels P_ij. For example, the spectral response curves of each sensor pixel may be stored in the memory 160 in a matrix form. According to an embodiment of the present disclosure, the spectral response curves of each spectral channel may be stored in the memory 160.

According to an aspect of the present disclosure, each spectral measurement can generate a vector including as many components as the total number of spectral channels, i.e., L components. Each of the L components represents the measured intensity of light in the corresponding one of the L spectral channels of the sensing unit 100. In this case, calculation of the spectral distribution of the incident light that generated the vector of L components becomes a mathematical problem of solving a matrix equation M=TI, in which M represents the L-dimensional vector representing the measured outputs from the L spectral channels, T represents the matrix characterizing the L spectral response curves of the L spectral channels, and I represents the vector representing the unknown spectral distribution of the incident light.

Algorithm for solution for this type of problem is described in U.S. Pat. No. 9,395,244 B2 to Kurokawa et al., U.S. Pat. No. 8,284,401 B2 to Choi et al., and U.S. Pat. No. 8,542,359 B2 to Choi et al, the entire contents of which are incorporated herein by reference. The program controller 170 can be loaded with a program that solves the matrix equation based on the data for the spectral response curves of the spectral channels of the sensing unit 100. The connection cable 185 and the connector 180 can be employed to display the solution for the solution for the vector I in a graphical format, which may be a curve showing the estimated spectral composition of the measured incident light.

Alternatively, the data for the spectral response curves of the spectral channels of the sensing unit 100 and/or the program that solves the matrix equation may be saved in a stand-alone computer or in at least one cloud server. In this case, the identification number for the sensing unit 100 can also be stored along with the data for the spectral response curves of the spectral channels of the sensing unit 100 to ensure that the correct dataset is employed for each calculation of the vector representing the unknown spectral distribution of the incident light.

Generally, the optical filters 10 can be designed to provide transmission curves providing an integrated transmission of about the same magnitude. As used herein, an "integrated transmission" refers to the integral of a transmission curve over the entire wavelength range of the sensing unit 100. In this case, a low sensitivity of the photodetector 20 within the wavelength range including the peak regions of the transmission curve of an overlying optical filter 10 results in low detection efficiency for the sensor pixel including the optical filter 10 and the photodetector 20. Thus, the sensitivity curve of the photodetectors 20 has a direct impact on the magnitude of the electronic signal generated from each sensor pixel.

Referring to FIG. 5, and according to an aspect of the present disclosure, the total number of sensor pixels within each spectral channel can be non-uniformly distributed such that each spectral response curve of the spectral channels provide approximately the same detection efficiency, i.e., the integral of the product of the transmission curve of the optical filter(s) 10 of the spectral channel and the sensitivity curve of the photodetector 20 over the entire wavelength range of the sensing unit 100.

Eight spectral channels including the first spectral channel 150_1, the p-th spectral channel 150_p, the q-th spectral channel 150_q, the r-th spectral channel 150_r, the s-th spectral channel 150_s, the t-th spectral channel 150_t, the u-th spectral channel 150_u, and the L-th (last) spectral channel 150_L are illustrated in FIG. 5. In this illustrative example, the sensitivity curve of the photodetectors 20 can occur at the wavelength at which the optical filter 10 of a sensor pixel for the r-th spectral channel 150_r has the highest peak. The ratio of the detection efficiency of a single sensor pixel within each of the first spectral channel 150_1, the p-th spectral channel 150_p, the q-th spectral channel 150_q, the r-th spectral channel 150_r, the s-th spectral channel 150_s, the t-th spectral channel 150_t, the u-th spectral channel 150_u, and the L-th spectral channel 150_L can be approximately 1/6:1/3:1/2:1:1/2:1/4:1/7:1/12. In this case, the ratio of the numbers of sensor pixels within each spectral channel among the first spectral channel 150_1, the p-th spectral channel 150_p, the q-th spectral channel 150_q, the r-th spectral channel 150_r, the s-th spectral channel 150_s, the t-th spectral channel 150_t, the u-th spectral channel 150_u, and the L-th spectral channel 150_L can be 6:3:2:1:2:4:7:12. Thus, the weak signal from sensor pixels having a low detection efficiency can be combined within each spectral channel to provide a signal of sufficient strength (electrical current), while a strong signal from a sensor pixel or a small number of sensor pixels can be provided to the signal processing unit 140 without significant combination of signals. The overall signal set has a higher fidelity than a comparative exemplary scheme in which each spectral channel has a fixed number of sensor pixels.

According to an aspect of the present disclosure, a spectrum sensor 200 is provided, which includes: an array of sensor pixels P_ij located on a substrate 130; and a signal processing unit 140 including L spectral channels, L being an integer greater than 7. Each of the sensor pixels P_ij comprises a stack of a respective photodetector 20 and a respective optical filter 10 configured to pass light with a respective transmissivity curve. For each integer k from 1 to L, a k-th spectral channel receives an output signal from each sensor pixel including an optical filter 10 proving a k-th transmissivity curve. At least one spectral channel among the L spectral channels has a greater number of sensor pixels than another spectral channel among the L spectral channels. The number L can be in a range from 8 to 16,384, although lesser and greater numbers can also be employed.

In one embodiment, the array of sensor pixels can be arranged as a rectangular M×N array of sensor pixels. M can be an integer in a range from 4 to 4,096, and N can be an integer in a range from 4 to 4,096.

In one embodiment, the ratio of the maximum number of sensor pixels per spectral channel to the minimum number of at least one sensor pixel per spectral channel can be in a range from 4 to 30. The minimum number of at least one sensor pixel may be in a range from 1 to 1,024 although lesser and greater numbers can also be employed.

In one embodiment, the minimum number of at least one sensor pixel per spectral channel can be for a spectral channel connected to an optical filter 10 having a peak transmission wavelength around the peak of the sensitivity curve of the photodetectors 20, which can be within a wavelength range from 500 nm to 600 nm. The maximum number of sensor pixels per spectral channel is for a spectral channel connected to an optical filter 10 having a peak transmission wavelength at a tail end of the sensitivity curve of the photodetectors 20, which can be within a wavelength range from 750 nm to 1,200 nm.

In one embodiment, at least one of the L spectral channels can receive an output signal from 10 or more sensor pixels, and at least another of the L spectral channels can receive an output signal from only 1 or 2 sensor pixels.

In one embodiment, each sensor pixel within the array of sensor pixels can have a respective area within 90% and 110% of an average area of sensor pixels within the array of sensor pixels. In one embodiment, each sensor pixel within the array of sensor pixels can have the same area.

In one embodiment, each photodetector 20 in the array of sensor pixels comprises a same semiconductor material having a same photosensitive junction structure and has a same device area. In one embodiment, each photodetector in the array of sensor pixels can be of an identical design, and have the same sensitivity curve as a function of the wavelength.

In one embodiment, each optical filter can be a plasmonic filter including a respective metal sheet and openings therethrough.

In one embodiment, for each integer k from 1 to L, each sensor pixel for the k-th spectral channel can have a k-th detection efficiency. For a positive integer kp that is less than L+1, a kp-th detection efficiency can be the maximum detection efficiency among all detection efficiencies of the sensor pixels. At least one spectral channel among the L spectral channels can have a greater number of sensor pixels than a total number of sensor pixels for the kp-th spectral channel. In one embodiment, for each integer from 1 to L, a product of the k-th detection efficiency and a total number of at least one sensor pixel for the k-th spectral channel can be within a range from 50% to 200% (which may be from 75% to 150% and/or from 90% to 110%) of the product of the kp-th detection efficiency and the total number of at least one photodetector spectral channel for the kp-th spectral channel.

In one embodiment, the signal processing unit 140 can include an array of signal attenuators (as embodied as components of the signal amplifiers therein) that are configured to attenuate a signal for a respective one of the L spectral channels. In one embodiment, the signal processing unit 140 can include a calibration table including attenuation factors for each of the L spectral channels, and each of the attenuation factors is within a range from 0.5 to 1.0 (which may be within the range from 0.75 to 1.0 and/or within the range from 0.90 to 1.0).

Figure 6:
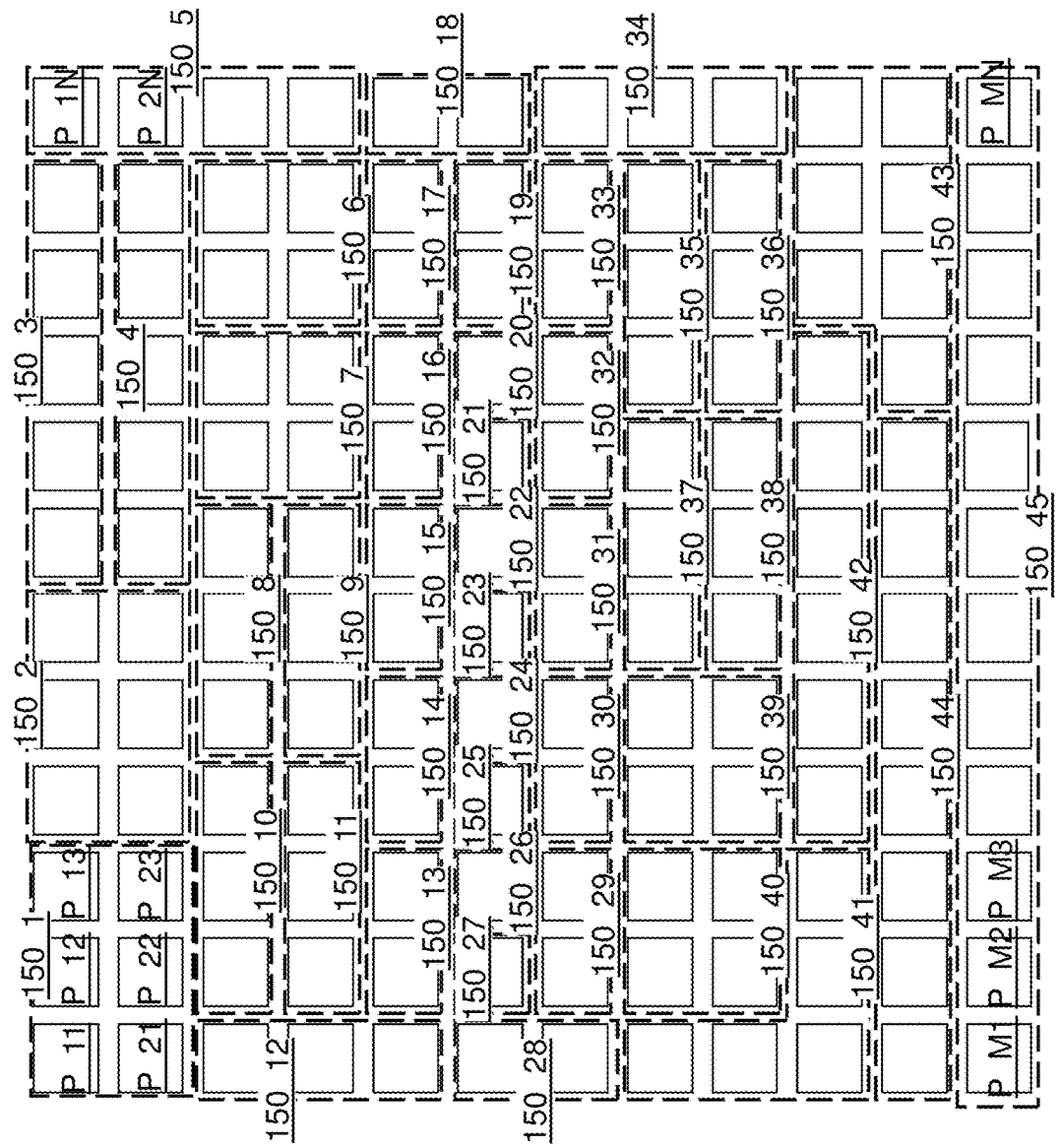
FIG. 6 is a first schematic plan view of the sensor array that shows partition of the array of sensor array into multiple spectral channel regions according to an embodiment of the present disclosure.
Figure 7:
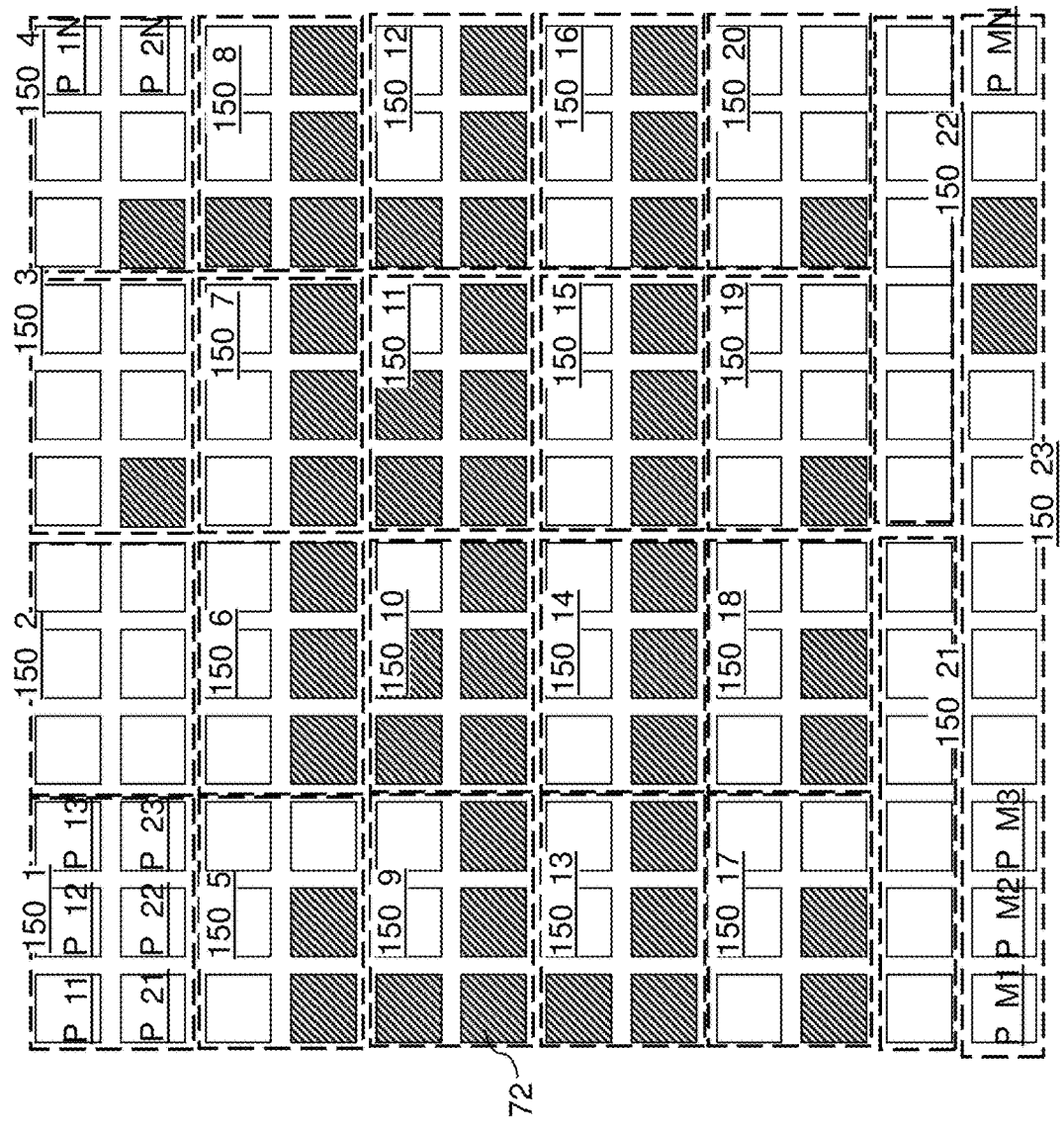
FIG. 7 is a second schematic plan view of the sensor array that shows partition of the array of sensor array into multiple spectral channel regions according to an embodiment of the present disclosure.

The sensor pixels can be grouped into blocks that correspond to a respective spectral channel. FIGS. 6 and 7 illustrate exemplary arrangements of such blocks. Each block represents a spectral channel region that embodies a spectral channel. FIG. 6 illustrates a configuration that includes s according to an embodiment 45 spectral channels, which range from the first spectral channel 150_1 to the 45-th spectral channel 150_45. The configuration of FIG. 7 employs 23 spectral channels. Dark pixels 72 are employed in the configuration of FIG. 7. The dark pixels are pixels in which an optical filter is replaced with an opaque layer, and provides an estimate of a leakage current within a sensor pixel. The estimated dark current (i.e., the electrical current caused by electronic and thermal noise) can be subtracted from each measured electrical current of the normal sensor pixels to provide a more accurate estimate of the electrical current generated by incident photons. The dark pixels 72 may be incorporated into each of the spectral channels, or may be incorporated only into a subset of the spectral channels.

Figure 8:
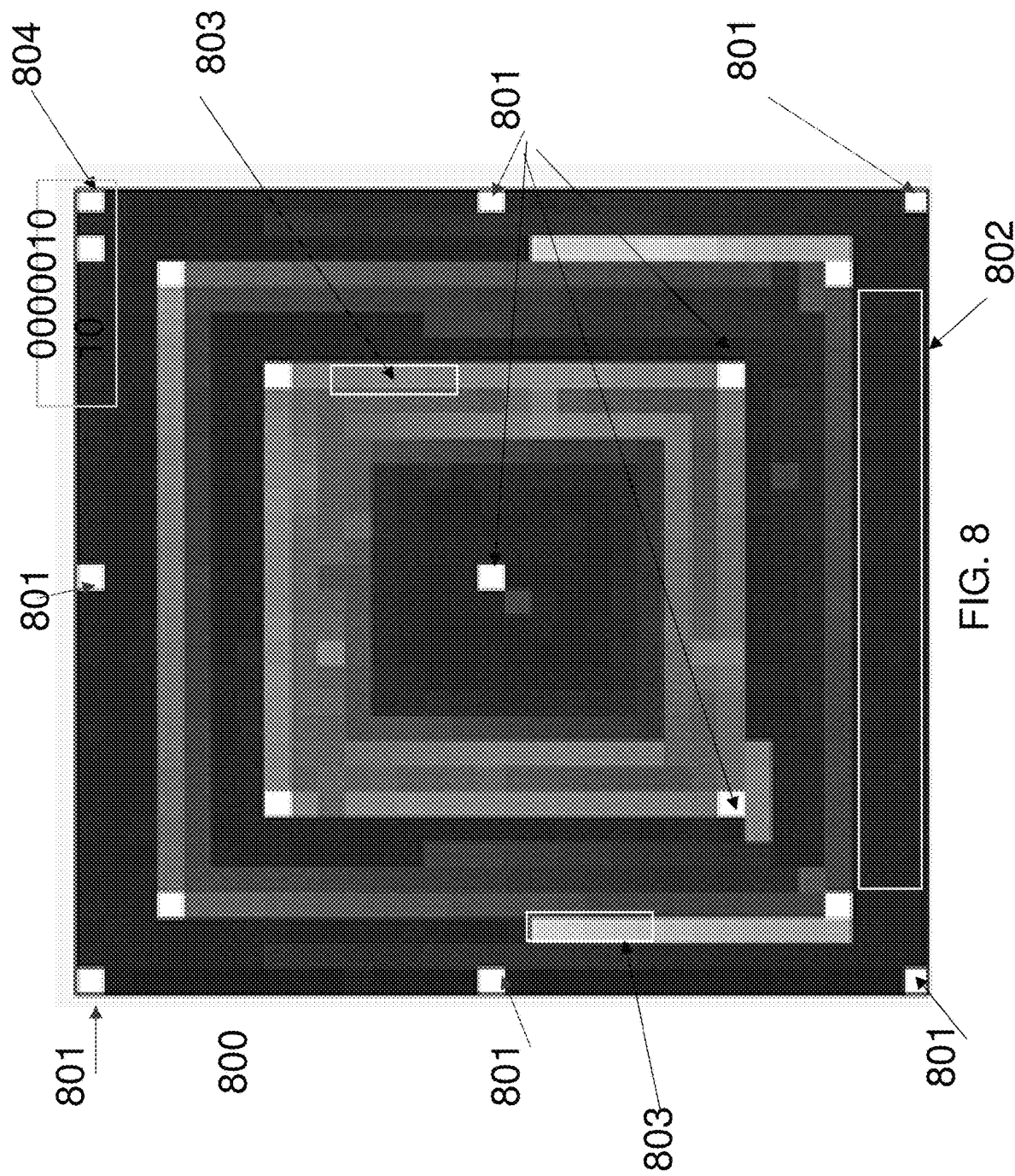
FIG. 8 an exemplary filter layout with different types of pixel uses reference pixels, black pixels, one spectral channel with more than 4 pixels, and pixels used for representing a filter design revision number.

FIG. 8 an exemplary filter layout with different types of pixel uses reference pixels, black pixels, one spectral channel with more than 4 pixels, and pixels used for representing a filter design revision number.

According to an aspect of the present disclosure, a spectrum sensor is provided, which comprises: an array of sensor pixels located on a substrate; and a signal processing unit including L spectral channels, L being an integer greater than 7, wherein: each of the sensor pixels comprises a stack of a respective photodetector and a respective optical filter configured to pass light within a respective transmission curve; for each integer k from 1 to L, a k-th spectral channel receives an output signal from each sensor pixel including an optical filter proving a k-th transmission curve; and at least one spectral channel among the L spectral channels has a greater number of sensor pixels than another spectral channel among the L spectral channels.

In one embodiment, the array of sensor pixels is arranged as a rectangular M×N array of sensor pixels; M is an integer greater than 4; and N is an integer greater than 4.

In one embodiment, the ratio of a maximum number of sensor pixels per spectral channel to a minimum number of at least one sensor pixel per spectral channel is in a range from 1.1 to 30.

In one embodiment, more than 10 pixels are used for black pixels which have no filters, covered by metal and receive no light; and black pixels are used for dark value compensation In one embodiment, at least four of the L spectral channels are used as reference pixels which have no filters, covered by only transparent layer and receives full spectrum of input light wherein; reference pixels are used for optimal integration time calculation.

In one embodiment, at least one of the L spectral channels receives an output signal from only 1 or 2 sensor pixels In one embodiment, each photodetector in the array of sensor pixels comprises a same semiconductor material having a same photosensitive junction structure and has a same device area.

According to an aspect of the present disclosure, a method of fabricating a spectrum sensor of the present disclosure is provided. An array of sensor pixels is formed on a substrate. A signal processing unit is electrically connected to the array of sensor pixels.

The devices and the methods of the present disclosure can be employed to provide an on-chip spectrum sensor having a higher fidelity and enhanced accuracy by allocating a finite number of sensor pixels within the array of sensor pixels (which may be M×N in case of a rectangular array) in a manner that ensures that each spectral channel provides approximately the same detection efficiency. Thus, the performance of the on-chip spectrum sensor can be enhanced through the non-equal partition of the sensor pixels into various spectral channels.

The devices and methods of the present disclosure can be applied to any optical device that requires complete characterization of spectral response curves for sensor pixels. Particularly, the devices of the methods of the present disclosure provides a significant advantage in devices employing plasmonic filters, which oftentimes include multiple peaks and valleys within a transmission window, i.e., a region in which the transmission curve significantly deviates from zero. As such, the devices and methods of the present disclosure can be applied to any optical device employing optical filters including at least two peaks and/or at least one valley in the transmission curve. Such an optical device can include an array of sensor pixels located on a substrate, and a signal processing unit including L spectral channels, L being an integer greater than 2, and/or greater than 3. Each of the sensor pixels comprises a stack of a respective photodetector and a respective optical filter configured to pass light within a respective transmission curve. For each integer k from 1 to L, a k-th spectral channel receives an output signal from each sensor pixel including an optical filter proving a k-th transmission curve. At least one spectral channel among the L spectral channels can have a greater number of sensor pixels than another spectral channel among the L spectral channels. The additional features of the spectrum sensors of the present disclosure can be incorporated into any such optical device, which may include cameras, X-ray detectors, microwave detectors, infrared imagers, and any other optical device employing spectral analysis of incident light.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A spectrum sensor comprising:
an array of sensor pixels located on a substrate; and
a signal processing unit including L spectral channels, L being an integer greater than 7, wherein:
each of the sensor pixels comprises a stack of a respective photodetector and a respective optical filter configured to pass light within a respective transmission curve;
for each integer k from 1 to L, a k-th spectral channel receives an output signal from the sensor pixels including an optical filter proving a k-th transmission curve; and
at least one spectral channel among the L spectral channels has a greater number of sensor pixels than another spectral channel among the L spectral channels;
wherein the spectrum sensor comprises at least one feature selected from:
(i) a first feature wherein a ratio of a maximum number of sensor pixels per spectral channel to a minimum number of at least one sensor pixel per spectral channel is in a range from 1.1 to 30; or
(ii) a second feature wherein at least four of the L spectral channels are used as reference pixels which have no filters, covered by only transparent layer and receives full spectrum of input light, wherein reference pixels are used for optimal integration time calculation; or
(iii) a third feature wherein each photodetector in the array of sensor pixels comprises a same semiconductor material having a same photosensitive junction structure and has a same device area; or
(iv) a fourth feature wherein each optical filter is a plasmonic filter including a respective conductive material sheet and openings, particles, wires or pillars therethrough; or
(v) a fifth feature wherein for each integer k from 1 to L, each sensor pixel for the k-th spectral channel has a k-th detection efficiency, for a positive integer kp that is less than L+1, a kp-th detection efficiency is a maximum detection efficiency among all detection efficiencies of the sensor pixels, and at least one spectral channel among the L spectral channels has a greater number of sensor pixels than a total number of sensor pixels for the kp-th spectral channel.

2. The spectrum sensor of claim 1, wherein:
the array of sensor pixels is arranged as a rectangular M×N array of sensor pixels;
M is an integer greater than 4; and
N is an integer greater than 4.

3. The spectrum sensor of claim 1, wherein the at least one feature comprises the first feature.

4. The spectrum sensor of claim 1, wherein: more than 10 pixels are used for black pixels which have no filters, covered by metal and receive no light; and black pixels are used for dark value compensation.

5. The spectrum sensor of claim 1, wherein the at least one feature comprises the second feature.

6. The spectrum sensor of claim 1, wherein at least one of the L spectral channels receives an output signal from only 1 or 2 sensor pixels.

7. The spectrum sensor of claim 1, wherein the at least one feature comprises the third feature.

8. The spectrum sensor of claim 1, wherein the at least one feature comprises the fourth feature.

9. The spectrum sensor of claim 1, wherein the at least one feature comprises the fifth feature.

10. The spectrum sensor of claim 9, wherein, for each integer from 1 to L, a product of the k-th detection efficiency and a total number of at least one sensor pixel for the k-th spectral channel is within a range from 50% to 200% of a product of the kp-th detection efficiency and a total number of at least one photodetector spectral channel for the kp-th spectral channel.

11. The spectrum sensor of claim 10, wherein the signal processing unit comprises an array of signal attenuators configured to attenuate a signal for a respective one of the L spectral channels.

12. The spectrum sensor of claim 11, wherein:
the signal processing unit comprises a calibration table including attenuation factors for each of the L spectral channels; and
each of the attenuation factors is within a range from 0.5 to 1.0.

13. A method of fabricating a spectrum sensor, comprising:
forming an array of sensor pixels on a substrate; and
electrically connecting a signal processing unit to the array of sensor pixels, wherein:
the signal processing unit includes L spectral channels, L being an integer greater than 7;
each of the sensor pixels comprises a stack of a respective photodetector and a respective optical filter configured to pass light within a respective transmission curve;
for each integer k from 1 to L, a k-th spectral channel receives an output signal from the sensor pixels including an optical filter providing a k-th transmission curve;
at least one spectral channel among the L spectral channels has a greater number of sensor pixels than another spectral channel among the L spectral channels; and
wherein a ratio of a maximum number of sensor pixels per spectral channel to a minimum number of at least one photodetector spectral channel per spectral channel is in a range from 1.1 to 30.

14. The method of claim 13, wherein:
the minimum number of at least one sensor pixel per spectral channel is for a spectral channel connected to an optical filter having a peak transmission wavelength within a wavelength range from 500 nm to 600 nm; and
the maximum number of sensor pixels per spectral channel is for a spectral channel connected to an optical filter having a peak transmission wavelength within a wavelength range from 750 nm to 1,200 nm.

15. A method of fabricating a spectrum sensor, comprising:
forming an array of sensor pixels on a substrate; and
electrically connecting a signal processing unit to the array of sensor pixels, wherein:
the signal processing unit includes L spectral channels, L being an integer greater than 7;
each of the sensor pixels comprises a stack of a respective photodetector and a respective optical filter configured to pass light within a respective transmission curve;
for each integer k from 1 to L, a k-th spectral channel receives an output signal from the sensor pixels including an optical filter providing a k-th transmission curve;
at least one spectral channel among the L spectral channels has a greater number of sensor pixels than another spectral channel among the L spectral channels;
at least one of the L spectral channels receives an output signal from 10 or more sensor pixels;
at least another of the L spectral channels receives an output signal from only 1 or 2 sensor pixels: and
each photodetector in the array of sensor pixels comprises a same semiconductor material having a same photosensitive junction structure and has a same device area.

16. The method of claim 15, wherein:
each optical filter is a plasmonic filter including a respective metal sheet and openings therethrough;
for each integer k from 1 to L, each sensor pixel for the k-th spectral channel has a k-th detection efficiency;
for a positive integer kp that is less than L+1, a kp-th detection efficiency is a maximum detection efficiency among all detection efficiencies of the sensor pixels; and
at least one spectral channel among the L spectral channels has a greater number of sensor pixels than a total number of sensor pixels for the kp-th spectral channel.

17. The method of claim 16, wherein, for each integer from 1 to L, a product of the k-th detection efficiency and a total number of at least one sensor pixel for the k-th spectral channel is within a range from 50% to 200% of a product of the kp-th detection efficiency and a total number of at least one photodetector spectral channel for the kp-th spectral channel.

18. The method of claim 17, wherein:
the signal processing unit comprises an array of signal attenuators configured to attenuate a signal for a respective one of the L spectral channels;
the signal processing unit comprises a calibration table including attenuation factors for each of the L spectral channels; and
each of the attenuation factors is within a range from 0.5 to 1.0.

* * * * *